United States Patent [19]
Cho et al.

[11] Patent Number: 6,069,499
[45] Date of Patent: May 30, 2000

[54] DATA SLICER

[75] Inventors: Gea-ok Cho; Chun-sup Kim, both of Suwon, Rep. of Korea

[73] Assignee: Samsung Electronics Co., Ltd., Kyungki-do, Rep. of Korea

[21] Appl. No.: 09/127,863

[22] Filed: Aug. 3, 1998

[30] Foreign Application Priority Data

Jul. 20, 1998 [KR] Rep. of Korea ...................... 98-29138

[51] Int. Cl.$^7$ ................................. G01R 19/00
[52] U.S. Cl. ................................. 327/58; 327/62; 327/59
[58] Field of Search ................................. 327/58–62, 72, 327/73, 74, 77, 78, 79, 80

[56] References Cited

U.S. PATENT DOCUMENTS

| | | | |
|---|---|---|---|
| 4,631,737 | 12/1986 | Davis et al. | 375/88 |
| 4,965,782 | 10/1990 | Mathews | 369/48 |
| 4,975,657 | 12/1990 | Eastmond | 330/279 |

Primary Examiner—Kenneth B. Wells
Assistant Examiner—Anh-Quan Tra
Attorney, Agent, or Firm—Sughrue, Mion, Zinn, Macpeak & Seas, PLLC

[57] ABSTRACT

A data slicer which effectively compensates for wobble and asymmetrical phenomena due to optical and electrical characteristics of a disk. The data slicer includes a comparator for outputting a pulse signal by comparing an RF signal detected by an pickup device with a slice reference value, a low pass filter for low-pass-filtering the pulse signal output from the comparator, a first differential amplifier for detecting the difference between the output of the low pass filter and a predetermined reference value (Vref), and providing the detected difference as the slice reference value of the comparator, a peak detector for detecting a peak value of the RF signal, a bottom detector for detecting a bottom value of the RF signal, and an average value detection portion for detecting an average value of the peak value detected by the peak detector and the bottom value detected by the bottom detector, and adding the detected value to the slice reference value of the comparator. Thus, an intermediate value of the RF signal is accurately detected by the peak detector, the bottom detector, and the average value detection portion, and the detected value is used as a slice level value. Thus, loss of data can be minimized.

9 Claims, 7 Drawing Sheets

DATA SLICER

BACKGROUND OF THE INVENTION

1. Field of the Invention

The present invention relates to a data slicer, and more particularly, to a data slicer which effectively compensates for wobble and asymmetrical phenomena due to optical and electrical characteristics of a disk.

2. Description of the Related Art

In a disk such as a DVD or a DVD-RAM, information is recorded in sector units. Each sector is comprised of a header information area having a physical identification data (PID) area and a user data area. FIGS. 1A and 1B show the format of header information recorded on a DVD-RAM disk. FIG. 1A shows the header information recorded at the first sector of a track and FIG. 1B shows the header information recorded at the other sectors.

As shown in FIGS. 1A and 1B, reference numerals 10 and 12 represent respectively a header information area and a user data area where user data is recorded. The header information area 10 is divided into a peak header area 10a and a bottom header area 10b, and the user data area 12 is divided into a land area and a groove area.

In a DVD-RAM disk, a track is formed spirally and the track is shifted laterally at a predetermined reference point. The reference point usually becomes a starting point of the first sector.

Referring to FIG. 1A, the lateral shift of the track occurs at the first sector. The header information at the first sector is disposed such that the peak header 10a occurs prior to the bottom header 10b when the next track is a land, whereas the header information at the first sector is disposed such that the bottom header 10b occurs prior to the peak header 10a when the next track is a groove. Thus, it can be identified whether the next track is a land or a groove.

Wobble is present in the user data area 12. The wobble means a wave formed between the land and the groove, as shown in FIGS. 1A and 1B, that is, corrugation of the side walls of a track (land or groove).

When a pickup device (not shown) reads signals recorded on tracks, a low frequency signal corresponding to the frequency of the wobble is superposed on an RF signal. The low frequency signal is referred to as a wobble signal and the wobble signal has a predetermined frequency according to the DVD specification.

As shown in FIGS. 1A and 1B, it can be seen that no wobble is formed in the header information area 10. This is because the header information is divided into the peak header 10a and the bottom header 10b and the peak header and the bottom header are recorded across the boundary of tracks. Thus, to guarantee recording of data in a correct position, an area such as buffer, gap or guard is inserted between the header information area 10 and the user data area 12.

FIG. 2 is a waveform diagram showing the relationship between a header signal and an RF signal. As shown in FIG. 2, the RF signal is comprised of a peak header portion 20, a bottom header portion 22, and a user data portion 24. The peak header portion 20 has a similar peak-peak value and a greater envelope than the user data portion 24 while the bottom header portion 22 has a similar peak-peak-value and a smaller envelope than the user data portion 24.

In the RF signal, since an asymmetrical phenomenon is generated due to the header signal, a level, i.e., a slice level, for slicing the data according to the change of the RF signal is necessary to accurately reproduce the original information.

FIG. 3 is a waveform diagram shown the relationship between the wobble signal and the RF signal. In FIG. 3, the wobble signal corresponds to a frequency component taken by connecting the middle points of the RF signal. As shown in FIG. 3, the RF signal is indicated as being superposed on the wobble signal and a level which slices data according to change of the wobble signal is necessary.

FIG. 4 is a block diagram showing the configuration of a conventional data slicer. Referring to the drawing, the data slicer includes a comparator 40, a low pass filter (LPF) 42, and an amplifier 44. In the apparatus shown in FIG. 4, a loop is applied through the amplifier 44 to trace such that the average electrical power of a sliced data pulse signal output from the comparator 40 is equal to a reference voltage $V_{REF}$. Thus, the comparator 40 finally outputs a signal having a duty ratio of 50%.

However, the apparatus shown in FIG. 4 cannot accurately trace the center level of the RF signal which becomes a slice level when an input signal changes rapidly or the wobble signal becomes greater. That is, although low-pass filtering should be applied strongly to trace the average electric power, since the low pass filter 42 is characteristically stable, an input wobble signal over a set frequency cannot be followed. Particularly, the above problem becomes serious as the DVD-RAM has a lots of signals, such as header signals, which change rapidly.

SUMMARY OF THE INVENTION

To solve the above problems, it is an objective of the present invention to provide a data slicer which accurately detects the original data without loss of data considering wobble and asymmetrical signals from a pickup.

Accordingly, to achieve the above objective, there is provided a data slicer includes a comparator for outputting a pulse signal by comparing an RF signal detected by an pickup device with a slice reference value, a low pass filter for low-pass-filtering the pulse signal output from the comparator, a first differential amplifier for detecting the difference between the output of the low pass filter and a predetermined reference value (Vref), and providing the detected difference as the slice reference value of the comparator, a peak detector for detecting a peak value of the RF signal, a bottom detector for detecting a bottom value of the RF signal, and an average value detection portion for detecting an average value of the peak value detected by the peak detector and the bottom value detected by the bottom detector, and adding the detected value to the slice reference value of the comparator.

Here, it is preferable that the data slicer further includes a level adjustment portion for controlling the difference between the peak value detected by the peak detector and the bottom value detected by the bottom detector to maintained a predetermined change level.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1A:
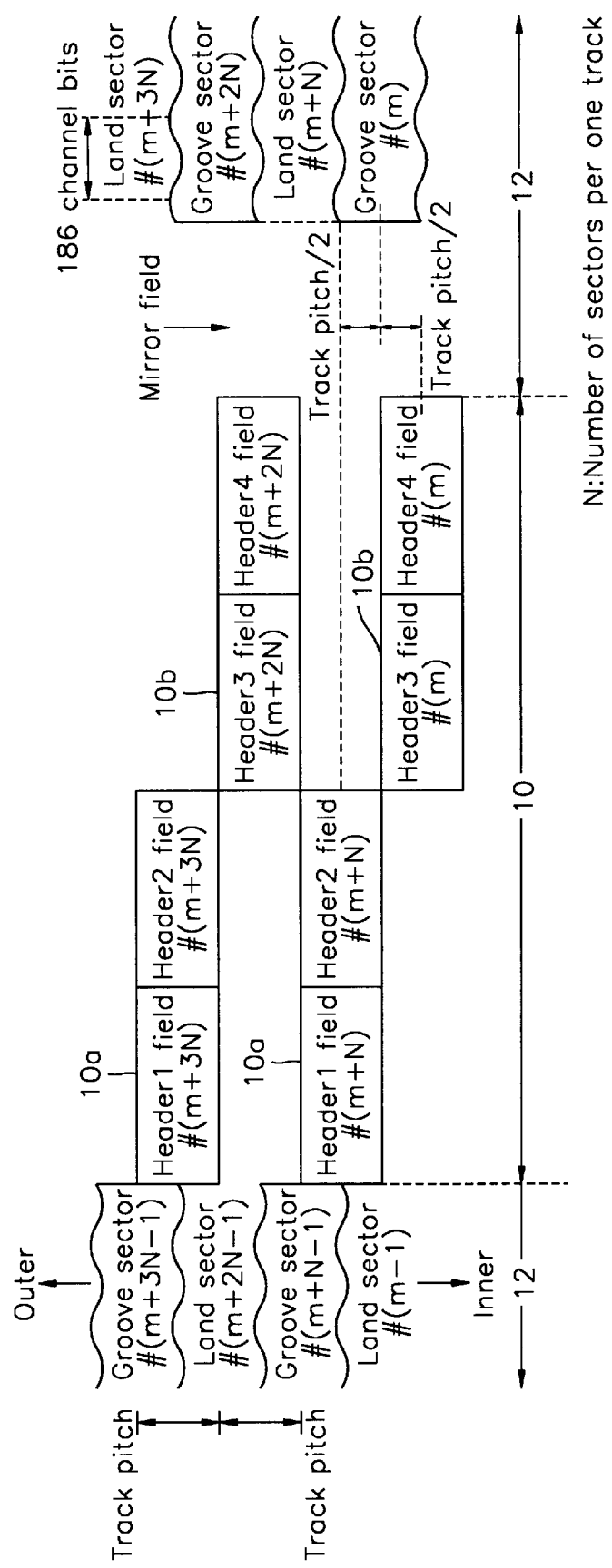
FIGS. 1A and 1B are diagrams showing the format of the header information recorded on a disk for DVD-RAM.
Figure 1B:
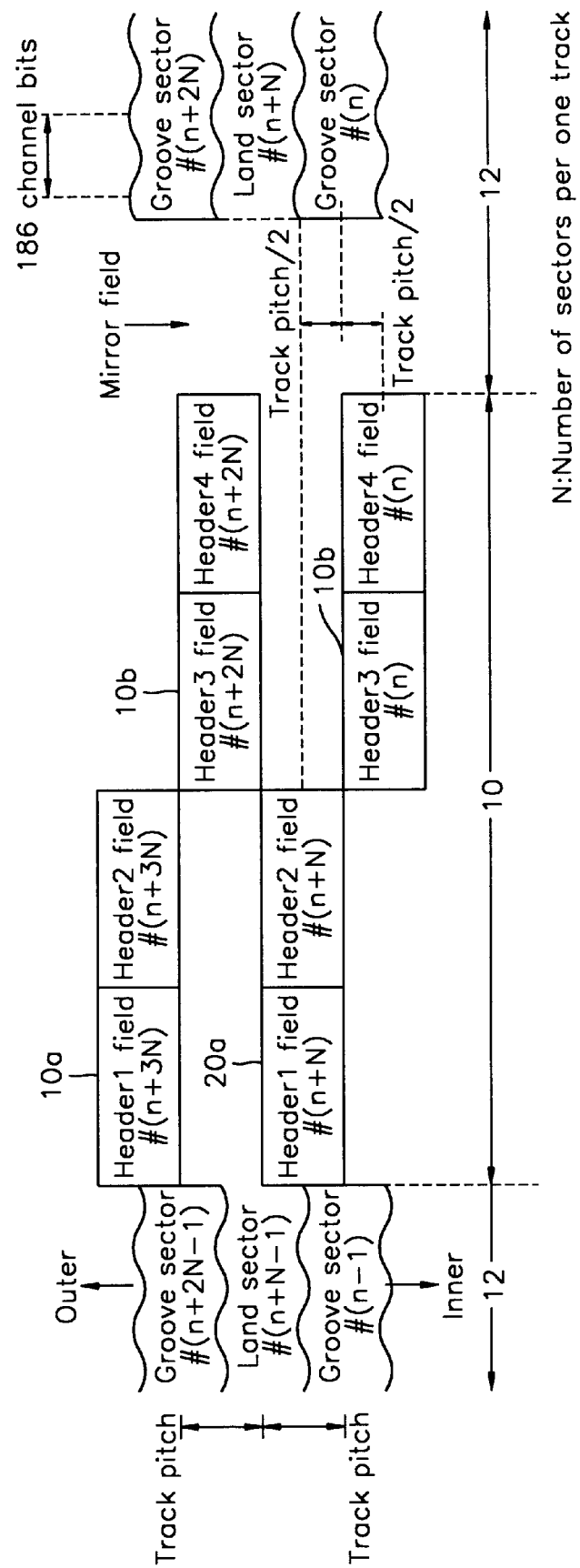
Figure 2:
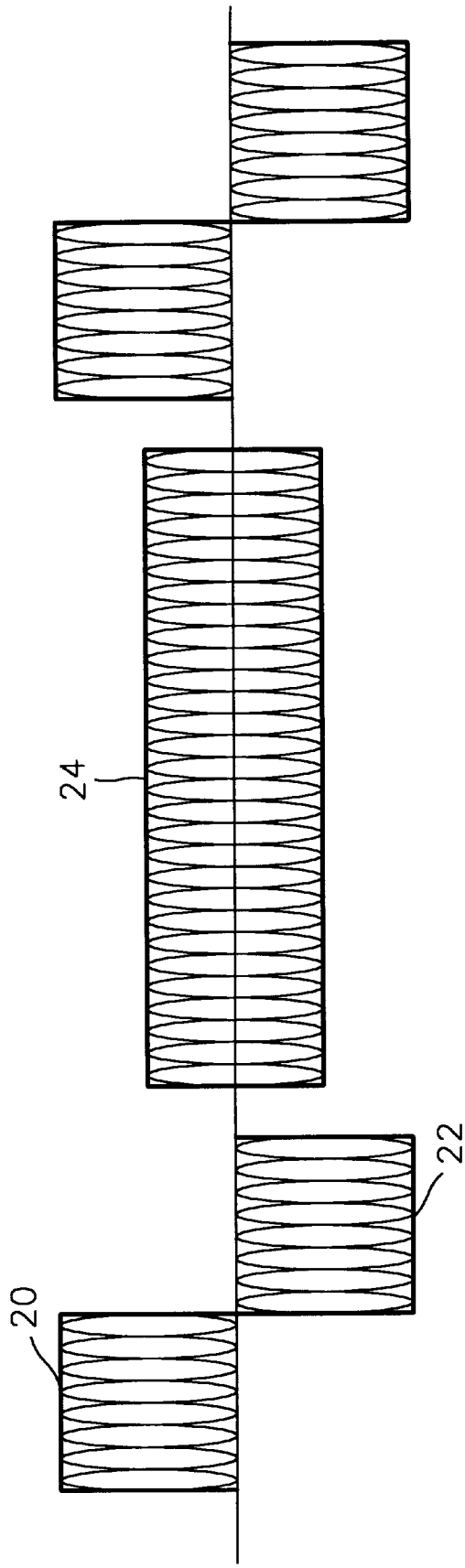
FIG. 2 is a waveform diagram showing the relationship between the header signal and the RF signal.
Figure 3:
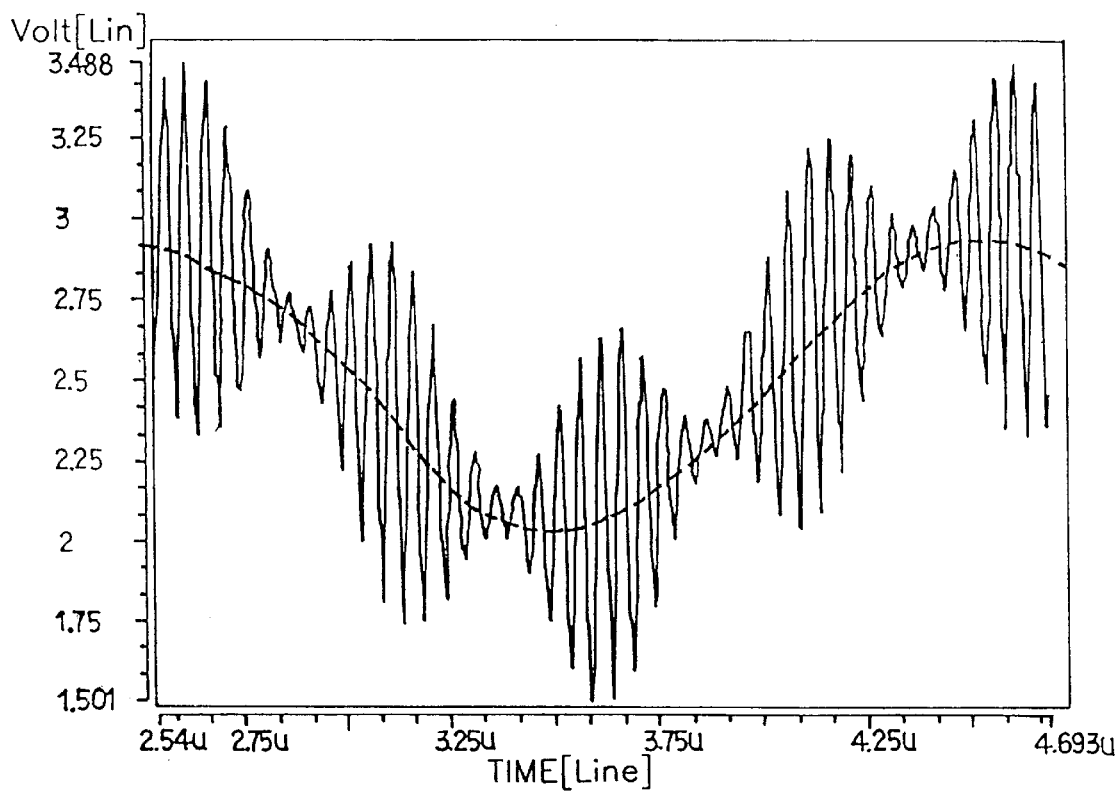
FIG. 3 is a waveform diagram showing the relationship between the header signal and the wobble signal.
Figure 4:
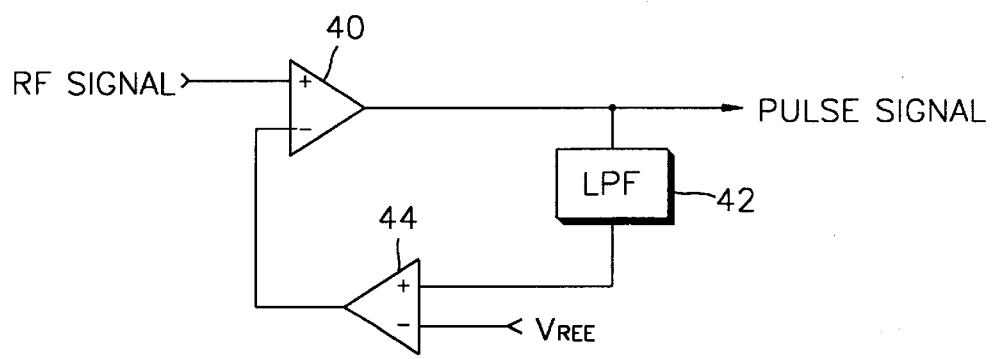
FIG. 4 is a block diagram showing the configuration of the conventional data slicer.
Figure 5:
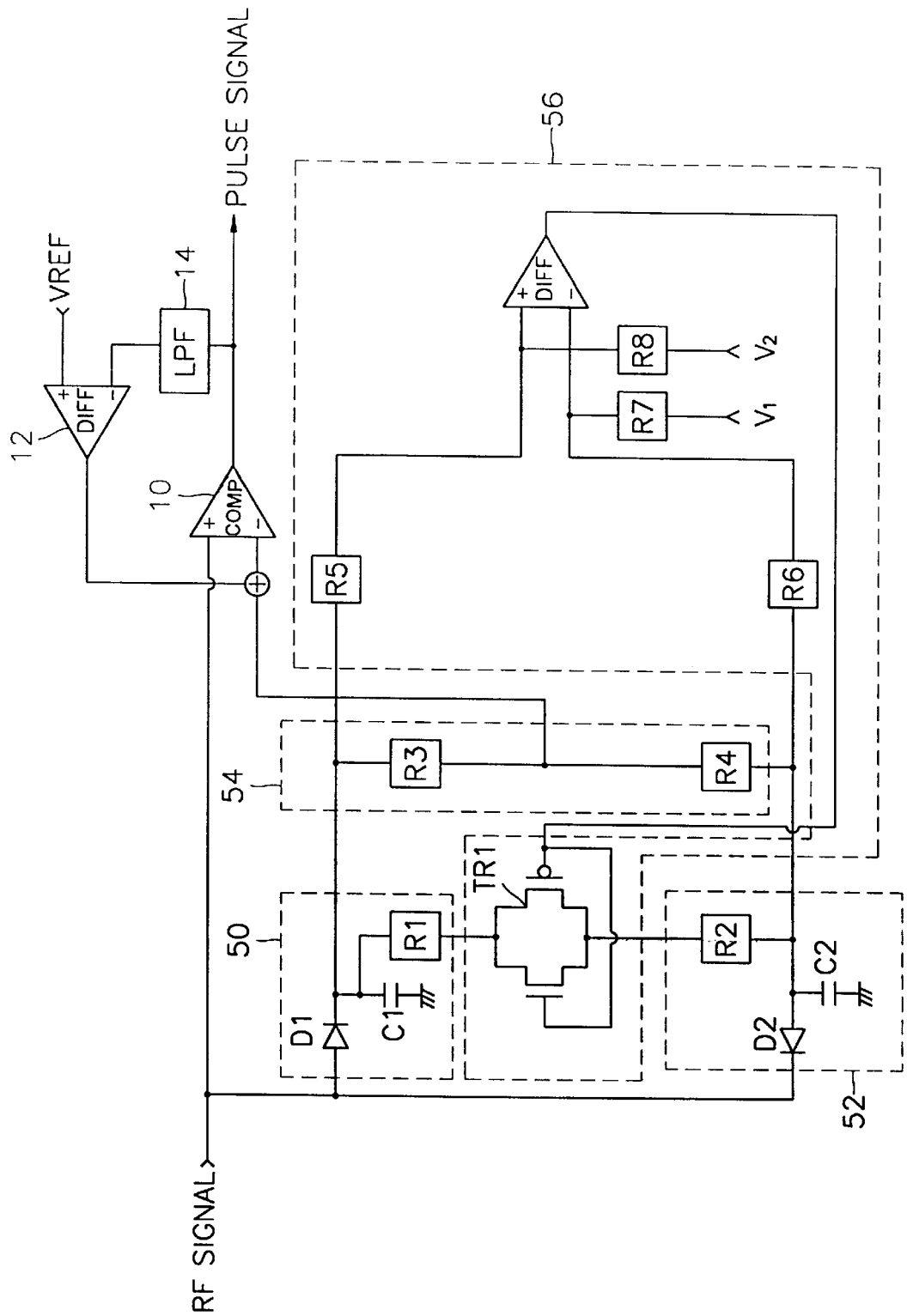
FIG. 5 is a block diagram showing the configuration of a data slicer according to a preferred embodiment of the present invention.

FIG. 5 shows a preferred embodiment of the present invention. Here, the detailed descriptions of the elements performing the same functions as those of FIG. 4 will be omitted.

Referring to FIG. 5, a data slicer according to a preferred embodiment of the present invention includes a peak detector 50, a bottom detector 52, an average value detection portion 54, and a level adjustment portion 56.

The peak detector 50 and the bottom detector 52 respectively detect a peak value and a bottom value of an input RF signal. The peak detector 50 and the bottom detector 52 are each embodied by a diode and an RC time constant circuit.

In the peak detector 50 shown in FIG. 5, a positive half-wave of the input RF signal is rectified by a diode D1 and the rectified positive half-wave charges a capacitor C1 so that a peak value of the RF signal is obtained. The capacitor C1 is discharged according to the time constant which is determined by the capacitor C1 and a resistor R1.

In the bottom detector 52 shown in FIG. 5, a negative half-wave of the input RF signal is rectified by a diode D2 and the rectified negative half-wave charges a capacitor C2 so that a bottom value of the RF signal is obtained. The capacitor C2 is discharged according to the time constant which is determined by the capacitor C2 and a resistor R2. The peak value and the bottom value detected by the peak detector 50 and the bottom detector 52, respectively, are provided to the average value detection portion 54.

The average value detection portion 54 detects an intermediate value of the peak value detected by the peak detector 50 and the bottom value detected by the bottom detector 52. The average value detection portion 54 has inputs respectively connected to the outputs of the peak detector 50 and the bottom detector 52. The average value detection portion 54 is comprised of series resistors R3 and R4 and a connection point thereof is connected to an inverting input port of a comparator 10. That is, when the values of R3 and R4 are equal, an average value, i.e., an intermediate value of the RF signal, equal to (peak value+ bottom value)/2 is obtained at the connection point between R3 and R4. The average value detected by the average value detection portion 54 is provided to the comparator 10.

When the intermediate value of the RF signal is obtained by the operations of the peak detector 50, the bottom detector 52 and the average value detection portion 54, the obtained value is provided as a reference value of the comparator 10. Since the data slicing is performed with the reference of the intermediate value of the RF signal, data can be accurately restored.

However, since the peak detector 50 and the bottom detector 52 respectively operate according to the set time constants, they are unable to properly trace an RF signal which charges more rapidly than the time constant. For example, when the peak value of the RF signal reaches a very high value for an instant and then continuously maintains a normal peak value, the peak value charged by the abnormally high peak value affects a section in which a normal peak value is continuously input.

Since the capacitor C1 of the peak detector 50 is discharged at a particular time constant determined by C1 and R1, the peak detector 50 cannot normally detect the peak value of an RF signal which changes more rapidly than the time constant. The same result is expected in the case of the bottom detector 52.

Accordingly, the reference value of the comparator 10 cannot accurately trace the intermediate value of the RF signal and thus data is lost. To prevent the loss of data, the level adjustment portion 56 is provided.

The level adjustment portion 56 allows the peak value and the bottom value detected by the peak detector 50 and the bottom detector 52, respectively, to change while maintaining a predetermined voltage level. As shown in FIG. 5, the level adjustment portion 56 is embodied by a bidirectional transistor TR1 and a differential amplifier DIFF which adjust the time constants of the peak detector 50 and the bottom detector 52.

For example, when a positive voltage is applied to a base of TR1, a path from R1 to R2 is formed, whereas, when a negative voltage is applied, a path from R2 to R1 is formed. When a path from R1 to R2 is formed, some charge of C1 flows into C2 so that the discharge time of C1 is reduced accordingly. When a path from R2 to R1 is formed, some charge of C2 flows into C1 so that the discharge time of C2 is reduced accordingly.

The time constant of the peak detector 50 or the bottom detector 52 is adjusted by the above operations. As a result, the peak detector 50 and the bottom detector 52 can trace rapid changes of the RF signal.

The differential amplifier DIFF controls the operation of TR1. That is, when the difference between the peak value and the bottom value is out of a predetermined voltage range, gain of TR1 of the time constant adjustment portion 56 is controlled so that the peak value stored in C1 and the bottom value stored in C2 can be rapidly discharged.

The differential amplifier DIFF controls the time constant adjustment portion 56 to trace the intermediate value such that the difference between the peak value detected by the peak detector 50 and the bottom value detected by the bottom detector 52 corresponds to a predetermined difference (V1−V2).

The peak value, via a resistor R5, and a second reference voltage V2, via a resistor R8, are applied to a non-inverting input of the differential amplifier DIFF. The bottom value, via a resistor R6, and a first reference voltage V1, via a resistor R7, are applied to an inverting input of the differential amplifier DIFF.

When R5 and R8 have equal values, a voltage V3 applied to the non-inverting input of the differential amplifier DIFF becomes an intermediate value between a peak value V5 detected by the peak detector 50 and the second reference voltage V2. Also, when R6 and R7 have equal values, a voltage V4 applied to the inverting input of the differential amplifier DIFF becomes an intermediate value between a bottom value V6 detected by the bottom detector 52 and the first reference voltage V1.

Here, V1 and V2 are an upper limit value and a lower limit value determining a scope of change of the peak value and the bottom value, respectively.

When the difference (V5−V6) between the peak value V5 and the bottom value V6 are the same as the difference (V1−V2) between the first reference value V1 and the second reference value V2, the differential amplifier DIFF outputs a voltage of a normal state, i.e., of a zero level, since the values applied to the non-inverting input and the inverting input of the differential amplifier DIFF are the same.

If the difference (V5−V6) between the peak value V5 and the bottom value V6 is greater than the difference (V1−V2) between the first reference value V1 and the second reference value V2, that is, if the peak value V5 is rapidly increased for some reason, the differential amplifier DIFF outputs a voltage of a positive level, since the voltage V3 applied to the non-inverting input of the differential amplifier DIFF is greater than the voltage V4 applied to the inverting input thereof. Accordingly, the transistor TR1 is controlled to form a path from R1 to R2 and part of the charge in C1 flows to C2 so that the peak value detected by the peak detector 50 is rapidly decreased. This state of decrease continues until the difference (V5−V6) between the peak value V5 and the bottom value V6 equals the difference (V1−V2) between the first reference value V1 and the second reference value V2.

If the difference (V5−V6) between the peak value V5 and the bottom value V6 is less than the difference (V1−V2) between the first reference value V1 and the second reference value V2, that is, if the bottom value V6 is rapidly increased for some reason, the differential amplifier DIFF outputs a voltage of a negative level, since the voltage V3 applied to the non-inverting input of the differential amplifier DIFF is less than the voltage V4 applied to the inverting input thereof. Accordingly, the transistor TR1 is controlled to form a path from R2 to R1 and part of the charge in C2 flows to C1 so that the bottom value detected by the bottom detector 52 is rapidly decreased. This state of decrease continues until the difference (V5−V6) between the peak value V5 and the bottom value V6 equals the difference (V1−V2) between the first reference value V1 and the second reference value V2.

Figure 6:
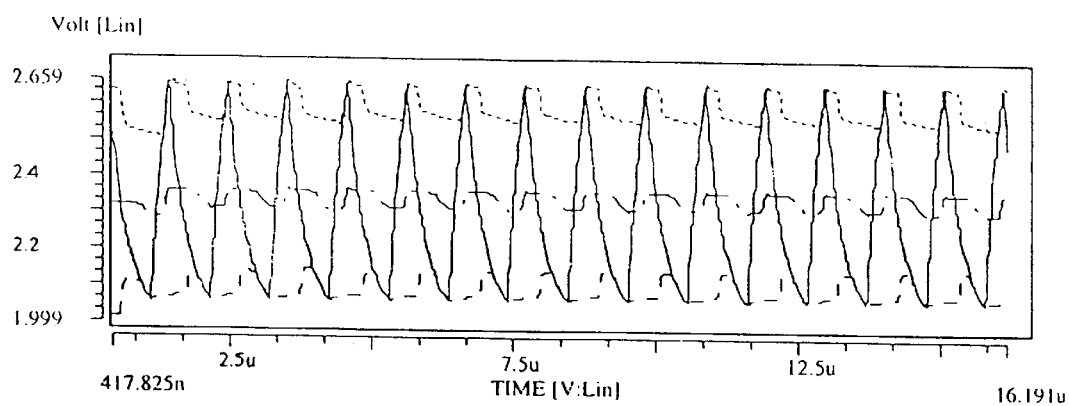
FIG. 6 is a waveform diagram showing changes of a peak value, an average value and a bottom value when a normal RF signal is input.

FIG. 6 is a waveform diagram showing the changes of the peak value, the average value and the bottom value when a normal RF signal is input. In the drawing, a solid line represents the RF signal, a dotted line in the upper portion represents the peak value, a dotted and dashed line in the middle portion represents the average value, and a dashed line in the lower portion represents the bottom value.

Figure 7:
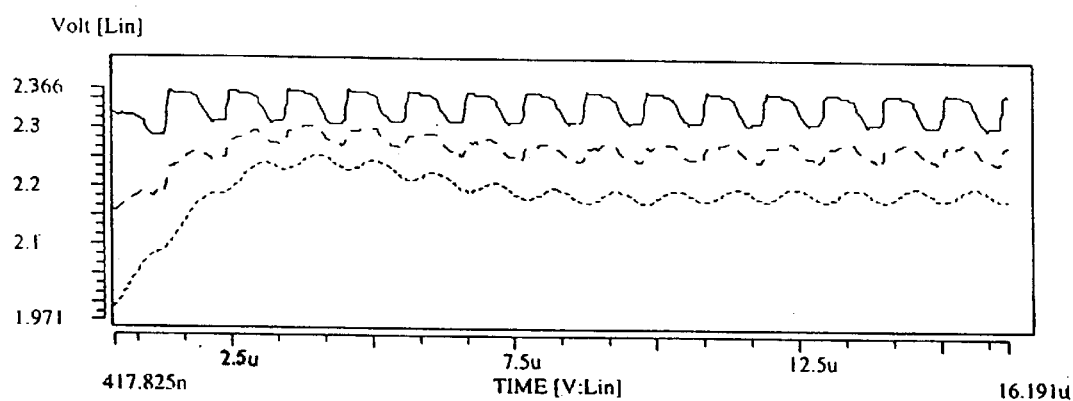
FIG. 7 is a waveform diagram showing changes of a peak value, an average value and a bottom value when an abnormal RF signal is input, in the case where there is no level adjustment portion 56.

FIG. 7 is a waveform diagram showing the changes of the peak value, the average value and the bottom value when an abnormal RF signal is input, in the case where there is no level adjustment portion 56. It can be seen that, initially, the difference value is minor between the peak value and the bottom value, and the difference value becomes normal at the later stage.

Figure 8:
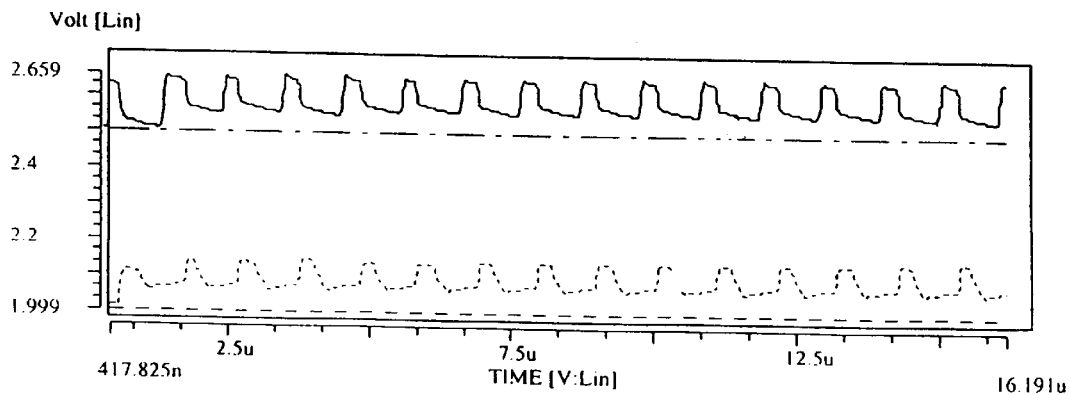
FIG. 8 is a waveform diagram showing changes of a peak value, an average value and a bottom value when an abnormal RF signal is input, in the case where there is the level adjustment portion 56.

FIG. 8 is a waveform diagram showing the changes of the peak value, the average value and the bottom value when the abnormal RF signal is input, in the case where there is the level adjustment portion 56. In FIG. 8, a solid line in the upper portion represents the peak value, a dotted line in the lower portion represents the bottom value, a dotted and dashed line in the upper portion represent the second reference value V2, and a thick dotted line in the lower portion represents the first reference value V1.

As shown in FIG. 8, it can be seen that the difference between the peak value and the bottom value is maintained equal to the difference between the first and second reference values, and changes very little.

Figure 9:
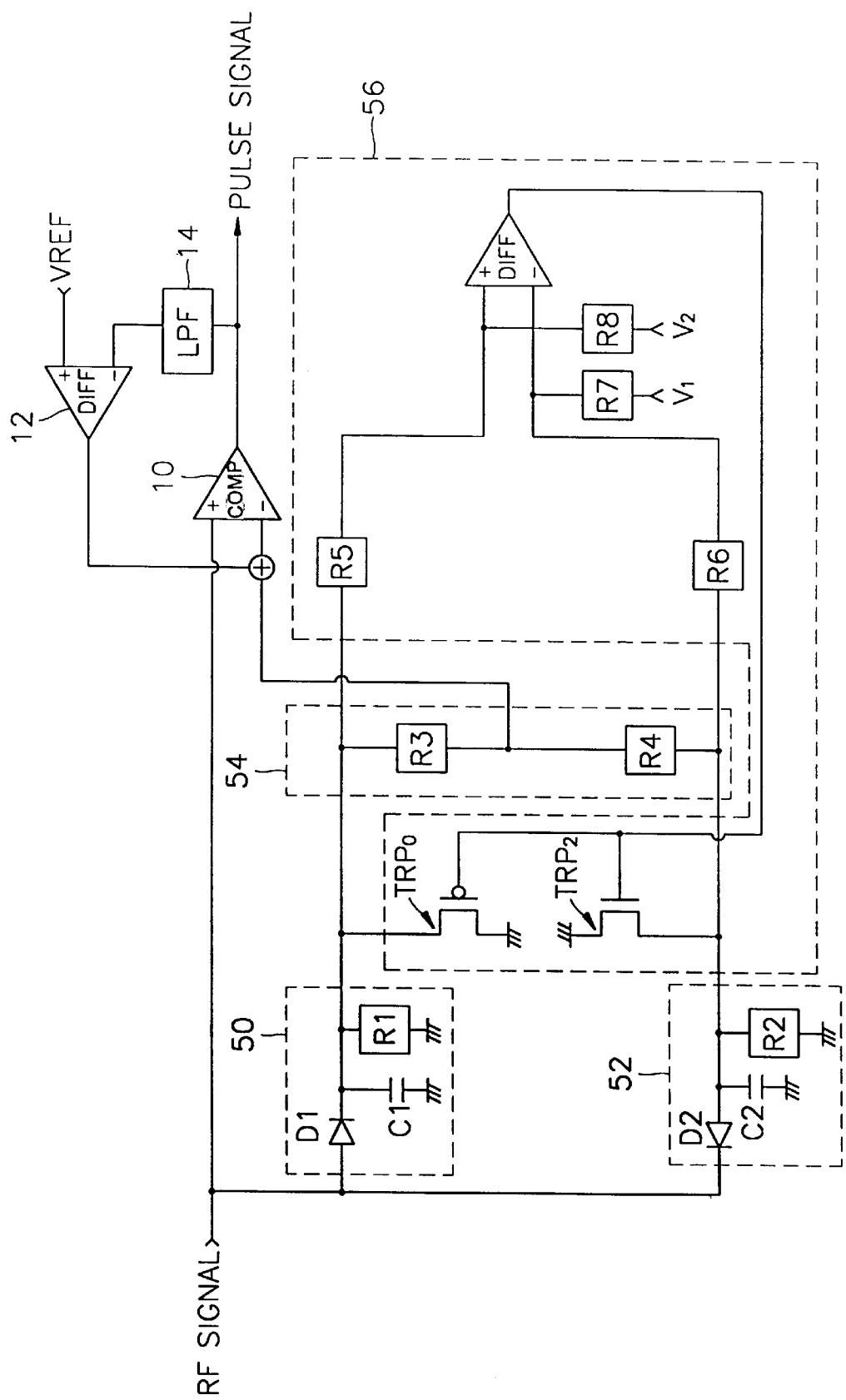
FIG. 9 is a block diagram showing the configuration of a data slicer according to another preferred embodiment of the present invention.

FIG. 9 is a block diagram showing the configuration of a data slicer according to another preferred embodiment of the present invention. The apparatus shown in FIG. 9 is different from that of FIG. 5 only in a portion for controlling the time constants of the peak detector 50 and the bottom detector 52. That is, a transistor $TRP_0$ is connected in parallel with R1 of the peak detector 50 and a transistor $TRP_2$ is connected in parallel with R2 of the bottom detector 52.

$TRP_0$ becomes conductive and discharges C1 when a positive voltage is applied to a bias port thereof. On the other hand, $TRP_2$ becomes conductive and discharges C2 when a negative voltage is applied to a bias port thereof. The other operations are the same as those of the apparatus shown in FIG. 5.

As described above, in the data slicer according to the present invention, the peak detector, the bottom detector, and the average value detection portion accurately detect an intermediate value of the RF signal, and the detected value is used as a slice level value. Thus, loss of data can be minimized. Also, in the data slicer according to the present invention, the level adjustment portion allows the peak detector and the bottom detector to rapidly trace the changes of the RF signal, so that data can be accurately restored.

What is claimed is:

1. A data slicer comprising:
    a comparator for outputting a pulse signal by comparing an RF signal detected by a pickup device with a slice reference value;
    a low pass filter for low-pass-filtering the pulse signal output from said comparator;
    a first differential amplifier for detecting a difference between an output of said low pass filter and a predetermined reference value (Vref), and providing the detected difference as the slice reference value of said comparator;
    a peak detector for detecting a peak value of the RF signal;
    a bottom detector for detecting a bottom value of the RF signal; and
    an average value detection portion for detecting an average value of the peak value detected by said peak detector and the bottom value detected by said bottom detector, and adding the detected value to the slice reference value of said comparator.

2. The data slicer as claimed in claim 1, further comprising a level adjustment portion for controlling a difference between the peak value detected by said peak detector and the bottom value detected by said bottom detector to maintain a predetermined change level.

3. The data slicer as claimed in claim 2, wherein said level adjustment portion comprises:
    means having a variable resistance, connected between said peak detector and said bottom detector; and
    a differential amplifier for controlling said variable resisting means corresponding to a difference between an average value between the peak value detected by said peak detector and a second reference voltage indicating a lower limit of level change level and an average value between the bottom value detected by said bottom detector and a first reference voltage indicating an upper limit of level change.

4. The data slicer claimed in claim 3, wherein said variable resisting means is a bidirectional transistor.

5. The data slicer as claimed in claim 3, wherein said variable resisting means comprises:
- a first transistor connected between said first resistor and a ground potential; and
- a second transistor connected between said second resistor and a ground potential.

6. The data slicer as claimed in claim 2, wherein said peak detector comprises:
- a first diode for rectifying a positive half-wave of the RF signal;
- a first capacitor charged by the positive half-wave detected by said first diode; and
- a first resistor forming a discharge path to discharge said first capacitor, and said bottom detector comprises:
- a second diode for rectifying a negative half-wave of the RF signal;
- a second capacitor charged by the negative half-wave detected by said second diode; and
- a second resistor forming a discharge path to discharge said second capacitor, and said level adjustment portion comprises:
- means having a variable resistance, connected between said first resistor of said peak detector and said second resistor of said bottom detector; and
- a differential amplifier for controlling said variable resisting means corresponding to a difference between an average value between the peak value detected by said peak detector and a second reference voltage indicating a lower limit of level change level and an average value between the bottom value detected by said bottom detector and a first reference voltage indicating an upper limit of level change.

7. The data slicer claimed in claim 6, wherein said variable resisting means is a bidirectional transistor.

8. The data slicer as claimed in claim 6, wherein said variable resisting means comprises:
- a first transistor connected between said first resistor and a ground potential; and
- a second transistor connected between said second resistor and a ground potential.

9. The data slicer as claimed in claim 1, wherein said peak detector comprises:
- a first diode for rectifying a positive half-wave of the RF signal;
- a first capacitor charged by the positive half-wave detected by said first diode; and
- a first resistor forming a discharge path to discharge said first capacitor, and said bottom detector comprises:
- a second diode for rectifying a negative half-wave of the RF signal;
- a second capacitor charged by the negative half-wave detected by said second diode; and
- a second resistor forming a discharge path to discharge said second capacitor.

* * * * *